United States Patent [19]

Nobukawa et al.

[11] Patent Number: 4,669,362
[45] Date of Patent: Jun. 2, 1987

[54] ROTARY FLUID PRESSURE CYLINDER DEVICE FOR OPERATING CHUCKS FOR MACHINE TOOLS

[75] Inventors: Akira Nobukawa; Kojiro Oota, both of Fukuyama; Tatuei Sawaguchi, Fuchu, all of Japan

[73] Assignee: Kabushiki Kaisha Kitagawa Tekkosho, Fuchu, Japan

[21] Appl. No.: 730,881

[22] Filed: May 6, 1985

[51] Int. Cl.$^4$ ............................................. F15B 13/04
[52] U.S. Cl. ..................................... 91/467; 92/106; 279/2 A
[58] Field of Search ...................... 91/420, 467; 92/60, 92/106; 279/2 A, 4; 60/413, 416

[56] References Cited

U.S. PATENT DOCUMENTS 3,892,165  7/1975  Lioux .................................. 279/4 X
3,986,437 10/1976  Lioux .................................. 92/60 X
4,319,516  3/1982  Röhm ................................. 279/4 X Primary Examiner—Stephen F. Husar
Attorney, Agent, or Firm—Beveridge, DeGrandi & Weilacher

[57] ABSTRACT

A power cylinder for operating a chuck for a machine tool has a rotary cylinder casing, a pair of check valves for confining a pressure fluid in an operating chamber, accumulators for absorbing impacts of the pressure fluid, and detecting means for detecting the fluid pressure in the operating chamber. The power cylinder can be rotated in a state wherein the feeding and discharging of the pressure fluid is stopped.

15 Claims, 6 Drawing Figures

FIG. I

ROTARY FLUID PRESSURE CYLINDER DEVICE FOR OPERATING CHUCKS FOR MACHINE TOOLS

BACKGROUND OF THE INVENTION

The present invention relates to a rotary fluid pressure cylinder device to be used for operating a power chuck for a machine tool.

Recently lathe spindles rotate at a remarkably high speed for a high speed cutting. The high speed cutting causes heat generation of a rotary fluid cylinder device in use for the operation of a power chuck. As such a cylinder device, there has been generally used one operated by means of hydraulic or pneumatic power. Particularly, in the case of using the hydraulic power, as hydraulic pressure is supplied to a rotating cylinder, the heat generation at a rotary fluid coupling part is great. As a principal cause thereof, the following matters may well be mentioned. Namely, the hydraulic pressure is supplied to the rotary fluid cylinder to move a chuck coupled therewith for holding a workpiece in a state wherein the rotation of the cylinder is stopped. The hydraulic pressure must be supplied thereto for the purpose of safety or for keeping the force of chuck also when it is rotating to perform a cutting operation. This pressure medium, that is, a hydraulic oil having a large viscosity, leaks into small clearances between the inner wall surface of a stationary casing and the surface of a rotary member in a rotary fluid coupling whereby the oil which is filled therebetween is subjected to a viscous friction due to a high circumferential speed of the rotary member surface thereby to generate heat. This heat generation is known to be increased in proportion to a square of the speed of the rotary member.

As one of countermeasures to the foregoing, there has been already proposed a method disclosed in Japanese Patent Laid-Open Publication No. 55-152991 (corresponding to German Patent Application No. 2919180.8). In this method, the relative speed between respective wall surfaces defining clearances is reduced. However, as small clearances are disposed double, the leakage loss increases. This leakage loss is also a cause of the heat generation next to that due to the viscous friction and this heat generation is based on transformation of the mechanical energy of the hydraulic oil to heat while the oil leaks into the clearances. The heat generation raises the temperature of the entirety of the device. As a countermeasures thereto, it may be considered reasonable to devise a betterment in the precision of parts of the cylinder to thereby additionally minimize the clearances. However, in consideration of the known fact that in a small clearance the viscous friction increases in inverse proportion to a square of the largeness of the clearance, it is not an effective measure to counter the heat generation.

Such heat generation as described above causes a thermal deformation of the rotary fluid cylinder, not only causing a reduction in the fluid efficiency, but also raising the temperature of the entirety of the device as aforementioned. Rising temperature has various detrimental results. To dispose of the heat generation, there are a number of available measures such as of equipping the cylinder with a cooling fan to thereby promote heat radiation, of inlaying heat pipes as heat exchanger members in heat generating portions to thereby transmit the heat outside, and of introducing atmospheric air near heat generating portions to thereby radiate a part of the heat, whereas none of such measures give a sufficient effect. Therefore, in those rotary fluid cylinder devices in which fluids are circulated, most of the devices employ particular cooling equipments.

From the view point of energy saving, such energy for cooling and the energy wasted by heat generation are all useless. In this respect, according to an experiment by the present inventor, when a hydraulic rotary cylinder with a through hole of a diameter of 120 mm is rotated under a hydraulic pressure of 25 kg/cm$^2$, a mechanical energy of approximately 1.5 kW is changed into heat to be lost at 1,500 r.p.m. because of the viscous friction.

SUMMARY OF THE INVENTION

It is an object of the present invention to provide a rotary fluid pressure cylinder device for a chuck for a machine tool in which, without employing particular cooling equipments, the heat generation due to viscous friction of hydraulic oil is effectively prevented.

According to the present invention, there is provided a rotary fluid pressure cylinder device for operating a chuck for a machine tool, comprising: a piston rod having a piston and connected to a chuck for holding a workpiece; a cylinder casing in which the piston rod is slidably accommodated and in which an operating chamber is formed for accommodating the piston; means for feeding a pressure fluid into the operating chamber and for discharging it therefrom; means for rotatably holding the cylinder casing in a state wherein the pressure fluid can be fed into the operating chamber; check valve means for permitting the pressure fluid to flow when the chuck is operated to hold or release the workpiece and for confining the pressure fluid in the cylinder casing including the operating chamber; accumulator means for compensating for the change of fluid pressure in the operating chamber in order to keep the fluid pressure therein constant; and means for detecting the pressure of the fluid confined in the operating chamber.

The above and further objects, details and advantages of the present invention will become apparent from the following detailed description of preferred embodiments of the invention when read in conjunction with the accompanying drawings.

DETAILED DESCRIPTION OF THE PREFERRED EMBODIMENTS

Figure 1:
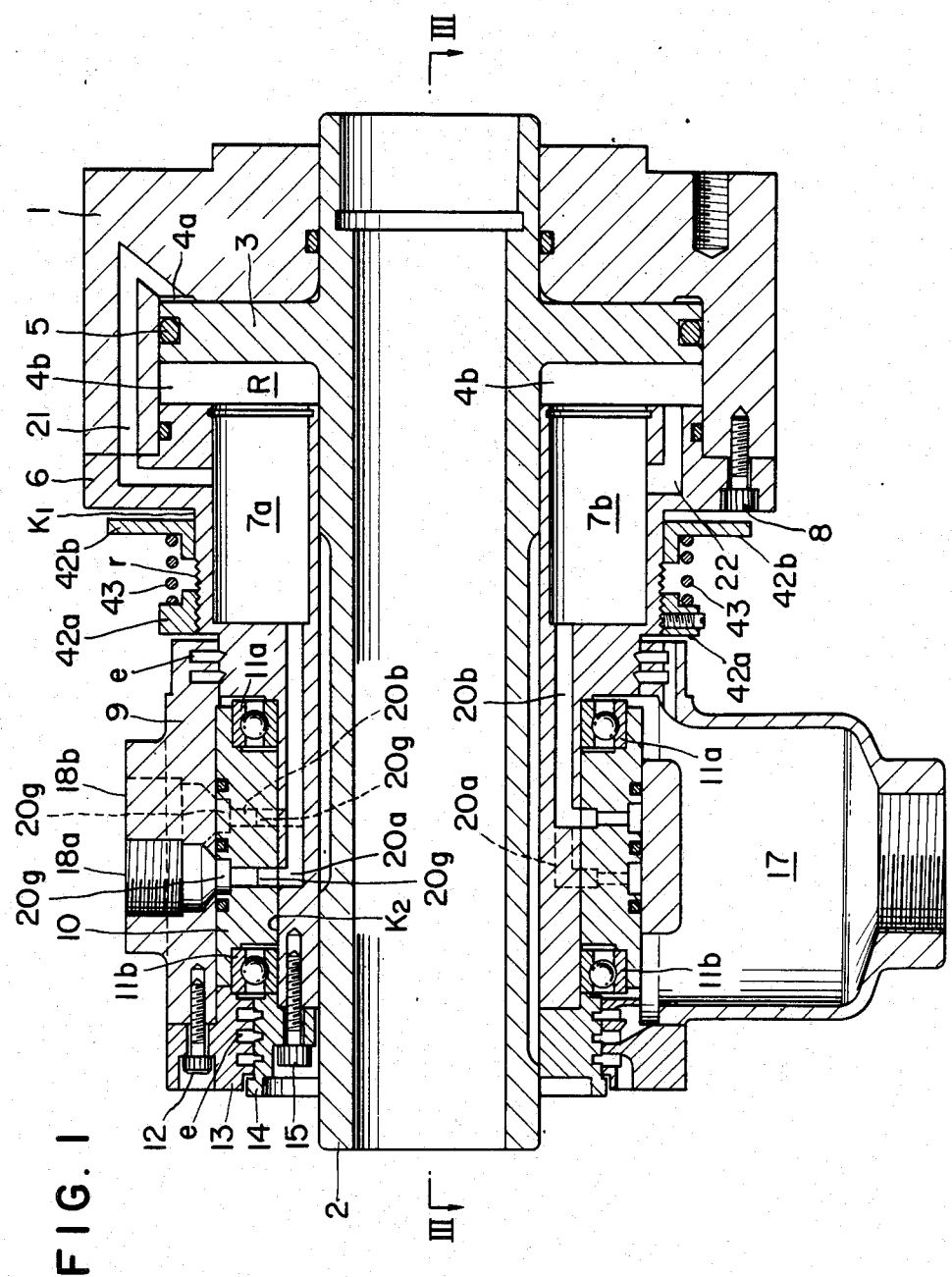
FIG. 1 is a vertically longitudinal sectional view of a power cylinder, as sectioned along a vertical plane, showing a first embodiment of the invention.

Referring first to FIG. 1 showing a power cylinder according to the invention, the power cylinder has a cylinder casing accommodating therein a piston rod 2 formed with a piston 3. The cylinder casing comprises a cylinder body 1 and a rotary valve 6. An oil operating chamber R in the cylinder body 1 is separated by the piston 3 into right and left operating chambers 4a, 4b, and an O-ring 5 is fitted on the peripheral surface of the piston 3. The rotary valve 6 is fastened by a bolt 8 to the cylinder body 1 and has in the vicinity of the chamber R a pair of check valve means 7a, 7b built therein for controlling the inflow and outflow of oil. In the embodiment shown, the piston rod 2 is connected at the right end thereof to a rotatable draw tube (not shown), and thereby adapted to vertically actuate jaws of a chuck body connected to the distal end of the draw tube (not shown) in accordance with later-described rightward and leftward strokes of the piston 3 for chucking and releasing a workpiece.

The rotary valve 6 comprises a large-diameter portion K1 and a small-diameter portion K2 inserted in a stationary sleeve body 9. Between the sleeve body 9 and the small-diameter portion K2 is provided a sleeve 10 which is also stationary. Two bearings 11a, 11b are fitted in both ends of the sleeve 10 and the bearing 11a directly abuts against an outside wall of the rotary valve 6 and the other bearing 11b abuts against an inside wall of a stationary sleeve cover 13 attached to the sleeve body 9 by using a bolt 12. On the end part of the rotary valve 6 is fitted a rotary stopper 14 secured thereto by using a bolt 15. In the contact area between the sleeve cover 13 and the stopper 14, as well as in the contact area between the rotary valve 6 and the sleeve body 9, there are formed sealing portions e of a labyrinth seal structure.

The sleeve body 9 is formed with a first oil bore 18a and a second oil bore 18b which serve as a combination of feed and discharge bores for oil. The first oil bore 18a communicates with a first oil path 20a formed through the sleeve 10 and the small-diameter portion K2 of the rotary valve 6; and the second oil bore 18b communicates with a second oil path 20b which is also formed through the sleeve 10 and the small-diameter portion K2 of the rotary valve 6. On the outside and inside of the sleeve 10 are formed annular grooves 20g, 20g, . . . 20g for communicating between the first and second oil paths 20a, 20b and the first and second oil bores 18a, 18b.

The first oil path 20a is connected to a first check valve means 7a having an oil path communicating with a third oil path 21 formed through the rotary valve 6 and the cylinder body 1 and the third oil path 21 opens to the oil chamber 4a. The second oil path 20b is connected to a second check valve means 7b which has an oil path communicating with a fourth oil path 22 formed through the rotary valve 6 and the fourth oil path 22 opens to the oil chamber 4b. The first and second check valves 7a, 7b are also connected to the second and first oil paths 20b, 20a as shown in dotted lines, respectively.

The sleeve body 9 is cut at a part thereof to be fitted with a drain reservoir 17.

From an unshown external oil supply equipment (oil tank), hydraulic oil is fed into the first oil bore 18a of the sleeve body 9 and flows into the check valve means 7a through the first oil path 20a. Then, the oil flows through the third oil path 21 formed in the cylinder body 1 into the oil chamber 4a to move the piston 3 to the left in the drawing. With this movement of the piston 3, the hydraulic oil in the oil chamber 4b is forced to flow through the fourth oil path 22 which is formed in the rotary valve 1 and connected to the oil chamber 4b, and via the check valve means 7b and the second oil path 20b, the oil flows into the external supply equipment (oil tank) after passing through the second oil bore 18b. In a forward (left) stroke of the piston 3, the first oil bore 18a serves as an oil feed bore, and the second oil bore 18 serves as an oil discharge bore. When the piston 3 starts a reverse (right) stroke thereof after completion of the forward stroke, a changeover valve (not shown) is operated so that the first oil bore 18a serves as a discharge bore of oil while the second oil bore 18b serves as a feed bore of oil.

Figure 2:
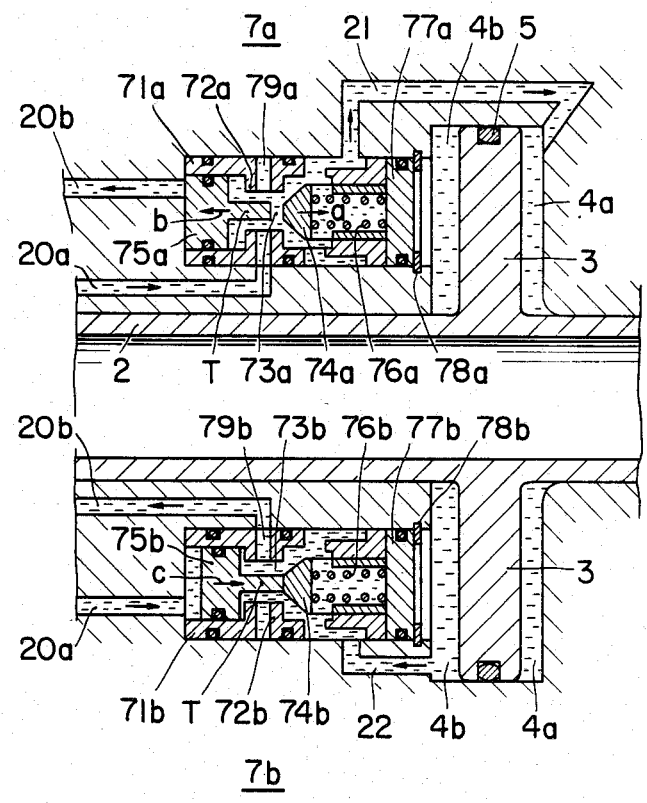
FIG. 2 is a detailed view of an essential part including check valve means of FIG. 1.

Referring now to FIG. 2, the check valve means 7a, 7b are shown as cylindrical valve bodies having radially inwardly projected partition walls 72a, 72b for separating inner spaces into respective right and left chambers. The right chambers accommodate therein pilot valves 74a, 74b, respectively, and the left chambers accommodate therein pilot spools 75a, 75b, respectively. The walls 72a, 72b have at the central parts thereof round holes 73a, 73b each communicating between the two left and right chambers. The inwardly projected walls 72a, 72b form valve seats with which conical heads of the pilot valves 74a, 74b urged by resilient forces of springs 76a, 76b are brought into contact to thereby close the round holes 73a, 73b, respectively. The numeral characters 77a, 77b indicate seal pads and the numeral characters 78a, 78b indicate stop rings. The walls 72a, 72b have therein radial through holes 79a, 79b drilled toward the round holes 73a, 73b. The through holes 79a, 79b communicate with the first and second oil paths 20a, 20b, respectively. Hydraulic oil fed from the first oil path 20a causes the pilot valve 74a to move it in the direction of arrow a against the spring 76a, thus flowing through the third oil path 21 into the oil chamber 4a in the cylinder body 1. At this time hydraulic oil in the oil chamber 4b on the opposite side flows through the fourth oil path 22 and the through hole 79b into the second oil path 20b and then is discharged from the second oil bore 18b. The back side of the pilot spool 75a communicates with the second path 20b while the back side of the other pilot spool 75b communicates with the first path 20a. Accordingly, during such action, the spool 75a slides in the direction of arrow b and the spool 75b slides in the direction of arrow c. With this state, a projection T of the spool 75b moves the pilot valve 74b in the same direction as the spool 75b against the spring 76b to open the round hole 73b.

For the convenience of drawing a figure, parts of the first and second oil paths 20a, 20b are illustrated in positions different from those of FIG. 1.

The above actions are described for the case in which hydraulic oil is fed into the oil chamber 4a in the cylinder body 1 while hydraulic oil in the oil chamber 4b is discharged. In the case where hydraulic oil is fed into the oil chamber 4b through the second oil path 20b while hydraulic oil in the oil chamber 4a is discharged, the flowing direction of the oil is reversed by changing over the valve (not shown) thereby to cause reversed actions of the check valve means 7a, 7b. Incidentally, either of rightward or leftward stroke of the piston 3 serves for tightening the workpiece and the other for releasing same. When the feeding of oil is stopped, the pilot valves 74a, 74b are moved to the left as viewed in FIG. 2 to close the round holes 73a, 73b, respectively whereby the pressure oil is confined in the oil operating chamber R. With this state, the workpiece is maintained to be tightly held by the chuck. Accordingly, a working operation for the workpiece can be carried out in a state where the feeding of the pressure oil is stopped.

Figure 3:
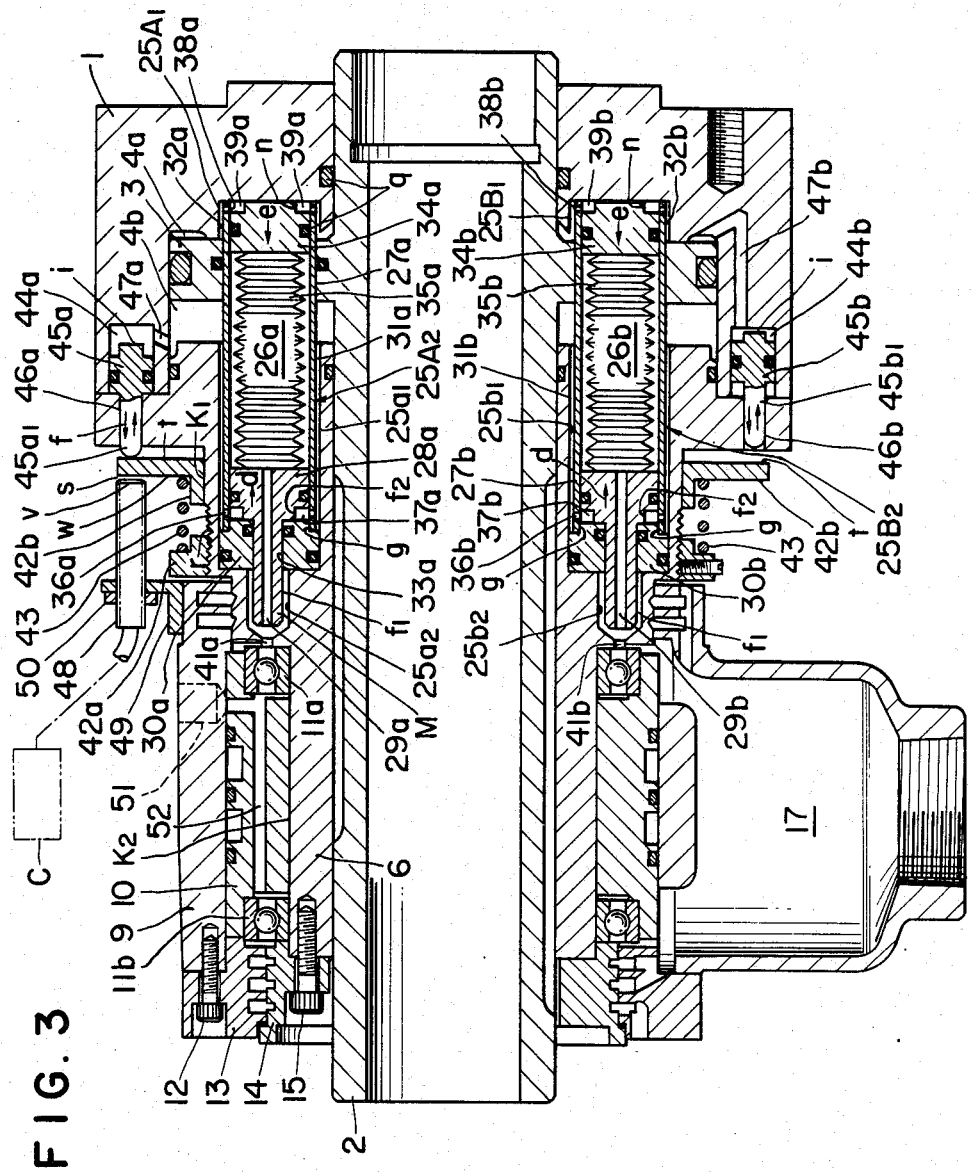
FIG. 3 is a sectional view taken along the line III—III of FIG. 1.

FIG. 3 shows a sectional view taken along the line III—III of FIG. 1, in which the aforementioned device includes a pair of accumulators 26a, 26b provided through the piston 3, respectively, and one-side ends of the accumulators 26a, 26b are located in hollow chambers $25A_1$, $25B_1$ formed in the cylinder 1 while the other ends thereof are located in hollow chambers $25A_2$, $25B_2$ formed in the rotary valve 6, respectively. This construction can prevent the piston 3 from rotating freely. The hollow chambers $25A_2$, $25B_2$ consist of large-diameter hollow portions $25a_1$, $25b_1$ and small-diameter hollow portions $25a_2$, $25b_2$, respectively. The accumulators 26a, 26b similar to each other are of such a constitution as will be described below with respect to the one accumulator 26a.

In the hollow chambers $25A_1$, $25A_2$ is provided a tubular casing body 27a in which a first accumulating piston 28a with a projected part M is accommodated. The part M forms a small-diameter portion $f_1$ and the piston 28a has also a middle-diamter portion $f_2$. The small-diameter portion $f_1$ of the projected part M is horizontally extended long to be inserted into the small-diameter hollow portion $25a_2$ of the rotary valve 6 and provided with a through hole 29a bored therein for guiding oil. The first accumulating piston 28a is normally urged by an elastic member described below toward the inside of the small-diameter hollow portion $25a_2$ of the rotary valve 6.

At a corner of the large-diameter hollow portion $25a_1$, there is fitted a seal pad 30a having a smaller-diameter portion g on the side of the piston 3. The left end of the tubular casing body 27a is tightly fixed to the portion g so as to define, along the outer periphery thereof, a clearance 31a communicating with the oil chamber 4b in the cylinder body 1. Between the inner surface of the hollow chamber $25A_1$ and the right end of the casing body 27a, there is another clearance 32a. In the seal pad 30a is bored a through hole 33a in which is slidably fitted the projected part M of the first accumulating piston 28a.

In the right end portion of the tubular casing body 27a, there is slidably fitted a second accumulating piston 34a which is adapted to cooperate with the first accumulating piston 28a via a chain of disc springs 35a as the aforementioned elastic member. The springs 35a normally urge the first accumulating piston 28a toward the seal pad 30a and the second accumulating piston 34a toward the hollow chamber $25A_1$ of the cylinder body 1.

Moreover, near the left end part of the tubular casing body 27a, there are provided radially opened through holes 36a communicating with an annular space 37a defined around the middle-diameter portion $f_2$ of the first accumulating piston 28a. Further, near the right end part of the tubular casing body 27a in the hollow chamber $25A_1$, there are also provided radially opened through holes 38a which communicate with another annular space 39a defined around a convexed part n of the second piston 34a. As a result, in a later-described operation, the annular spaces 37a and 39a are adapted so as to feed hydraulic oil into the tubular casing body 27a of the accumulator 26a, forcing the first accumulating piston 28a and the second accumulating piston 34a to slide in directions of arrows d and e against the coned disc springs 35a, respectively. In this manner, a predetermined quantity of oil is accumulated in the tubular casing body 27a. Incidentally, each reference character q designates an O-ring applied for sealing, i.e., for the prevention of oil leakage such as at joint or sliding portions. The oil leaking into the region of the tubular casing body 27a in which the coned disc springs 35a are located is discharged therefrom via the through hole 29a and flows into the small-diameter hollow portion $25a_2$ of the rotary valve 6, from which it is discharged toward the drain reservoir 17 via another through hole 41a opened to the bearing 11a. In FIG. 3, with respect to the accumulator 26a, the other accumulator 26b has corresponding parts designated by those reference characters having corresponding numerals with small letter b in place of small letter a.

The device according to the invention further comprises a detection means adapted to automatically function to stop supplying the cylinder body 1 with pressure medium, when the medium therein has reached a predetermined pressure level. In other words, on the large-diameter portion K1 of the rotary valve 6, there is provided a bracket plate 42a screwed on male threads r formed on the large-diameter portion K1 of the rotary valve 6. A slide plate 42b is opposed to the bracket plate 42a and is slidable on the peripheral surface of the portion K1. A spring 43 is provided between the two plates 42a, 42b to exert a spring force on the slide plate 42b which is brought into abutment agaist either of a pair of below-described detecting pistons movable in the axial direction of the piston rod 2.

The cylinder body 1 has, near the outer circumference thereof, a pair of relatively small cylindrical chambers 44a, 44b in which two detecting pistons 45a, 45b are reciprocally movably accommodated, respectively. The pistons 45a, 45b have bar-like portions $45a_1$, $45b_1$ horizontally projecting long so as to be slidable in horizontal through holes 46a, 46b bored in the rotary valve 6, respectively. The cylindrical chambers 44a and 44b are connected through oil paths 47a and 47b to the oil chambers 4b and 4a, respectively. In the embodiment shown, when the oil chamber 4b is supplied with hydraulic oil, a part of the oil is fed through the oil path 47a into the chamber 44a to exert hydraulic pressure on the back face i of the detecting piston 45a, thereby forcing the piston 45a in the direction of arrow f. As a result, the bar-like portion $45a_1$ is brought into abutment against the back face t of the slide plate 42b. At this time, the other oil chamber 4a functions as a chamber for discharging the oil therein. Thus, the detecting piston 45b is stationary. To the contrary, when the oil chamber 4a functions as a pressure chamber, the piston 45b moves toward the slide plate 42b to push it in the same direction against the spring 43 while the piston 45a is stationary.

In opposition to the slide plate 42b is disposed a detection bar 48 secured horizontally to a bearing support 49 fixed to the sleeve body 9. The detection bar 48 has a head v facing an inside face w of the slide plate 42b fitted on the rotary valve 6. The head v is normally separated from the slide plate 42b by the distance s of a predetermined value which is adjustable by turning an adjusting nut 50 fitted thereon. The adjusting nut 50 is screw-engaged with the outer surface of the detection bar 48.

In the sleeve body 9, a lubricating oil inlet 51 is provided for feeding the oil into the rotary portions of the device. During a cutting process, the supply of hydraulic oil to the oil chambers 4a, 4b in the cylinder body 1 is stopped. At this time, the lubricating oil is supplied to the bearings 11a, 11b through the inlet 51 and an oil path 52 bored in the sleeve 10.

The device according to the invention functions such that, with hydraulic oil fed into the oil chamber 4a or 4b in the cylinder body 1, the piston 3 is forced to travel to the right or left, thereby vertically actuating the jaw of the chuck body to chuck or release a workpiece. For example, the workpiece is now supposed to be chucked with a leftward movement of the piston 3 caused by hydraulic oil fed into the oil chamber 4a. In this case, a part of the hydraulic oil fed into the oil chamber 4a flows through the clearances 32a, 32b and the through holes 38a, 38b into the accumulators 26a, 26b, exerting pressure on the second accumulating pistons 34a, 34b. Then, the pistons 34a, 34b are slid in the direction of arrow e, while storing a predetermined quantity of oil in the accumulators 26a, 26b. Concurrently, a part of the hydraulic oil in this oil chamber 4a is introduced via the through hole 47b into the cylindrical chamber 44b. This causes the detecting piston 45b to slide in the direction of arrow f while pushing the back face t of the slide plate 42b with the distal end of the bar-like portion 45b$_1$. When the slide plate 42b approaches to the detection bar 48 until the distance between the bar 48 and the inside face w of the slide plate 42b becomes the predetermined value, the detection bar 48 outputs a signal, thereby automatically stopping the feeding and discharging of oil from the first and second oil bores 18a, 18b connected to the rotary fluid coupling. Thereafter, the cylinder device is rotated to carry out the machining of the workpiece while the pressure oil is shut up or confined in the oil operating chamber R by means of the check valves 26a, 26b.

The distance s is usually determined at the value of about 1 mm. However, the distance s may be varied with the level of the pressure of the hydraulic oil. The adjustment of the distance s is carried out by properly rotating the adjusting nut 50. In addition, the adjustment of the distance s is also carried out by turning the bracket plate 42a. The turning of the bracket plate 42 causes the spring 43 to shrink and expand whereby the repulsive force of the spring 43 at the time when the pistons 45a, 45b are operated is adjusted. In general, the gripping force of a chuck is varied with the kinds of workpieces in a manner that the pressure of the oil fed into the operating chambers 4a, 4b is varied. This causes the change of the pushing force of the detecting pistons 45a, 45b. Accordingly, the spring force of the spring 43 is adjusted so that the fluid pressure of the operating chamber reaches a desired value for holding a certain workpiece when the detecting bar 48 detects the distance s of a predetermined value.

To eliminate such adjustment, a controller C may be connected to the detection bar 48. The controller C functions to operate the feeding and discharging of oil when the detecting bar 48 detects each predetermined distance in correspondence with each level of the pressure of the oil fed into the oil operating chambers 4a, 4b. The provision of such controller C can eliminate the adjustment of the spring force.

The accumulators 26a, 26b built in the cylinder body 1 function to not only absorb impacts of a pressure fluid during a cutting operation but also compensate for the decrease in the sealed fluid pressure. That is, when a part of sealed hydraulic oil happens to be leaked after the oil feeding is shut off and when the piston 3 is slightly displaced due to a change of condition of a workpiece holding part of the chuck, the fluid pressure in the operating chamber 4a or 4b is decreased. At that time, the disc springs 26a, 26b expand to compensate for the decrease in the fluid pressure whereby the workpiece can be remained to be held tightly by the chuck. Furthermore, when the impacts of the pressure fluid are exerted on the piston 3, the disc springs 26a, 26b shrink to absorb the impacts.

In addition, the pressure fluid sealed in the cylinder body 1 may be subjected to a thermal influence due to temperature variations during the rotation of the device. This causes volume expansion or contraction of the fluid thereby to change the pressure of the chamber 4a or 4b. The accumulators 26a, 26b can effectively cope with this phenomenon. Besides above, when the pressure fluid exceeds a predetermined pressure range due to some causes, the detection bar 48 may give an alarm to change an operating condition or stop the operation. When the pressure of the fluid is lower than a predetermined value, the distance s becomes wider than the predetermined value. In this case, an inflow of hydraulic oil may be again started and the inflow is stopped when the predetermined pressure is restored.

As described hitherto, the device of the invention is provided with a detection means adapted to be operated in accordance with a pressure variation of a sealed fluid in the cylinder body 1 for monitoring automatically a pressure medium. Accordingly, a safe operation and work during a cutting process can be ensured.

The device according to the invention is still more distinctive over conventional devices in that it additionally comprises the oil path 52 for feeding lubricating oil into the bearings 11a, 11b and the contact region between the sleeve 10 and the rotary valve 6. In this power cylinder, as the optimum quantity of lubricating oil can be fed into the rotary or bearing portions of the power cylinder through the oil path 52 even after the fluid supply to the operating chamber 4a or 4b is stopped, a high speed operation of the cylinder can be carried out while minimizing the heat generation at the bearing or rotary portions of the power cylinder.

Figure 4:
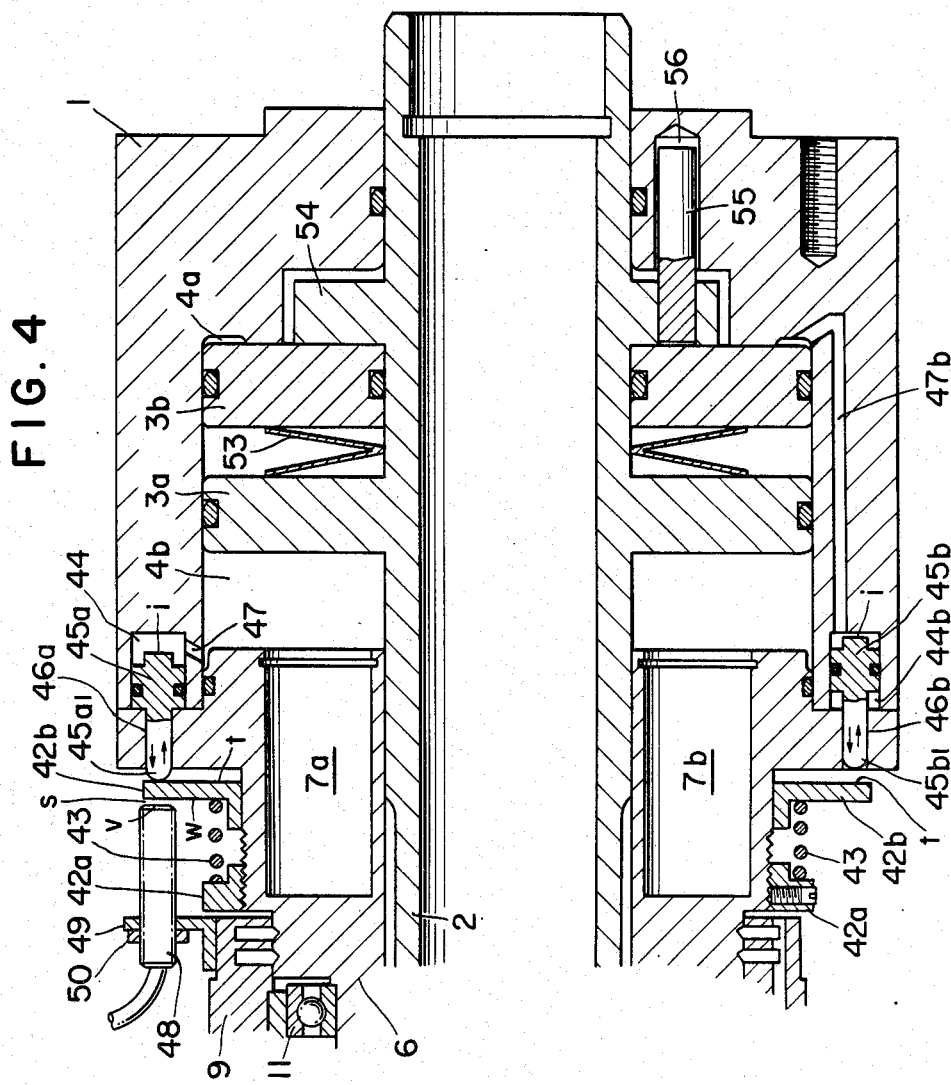
FIG. 4 is a partial longitudinal sectional view of a power cylinder, showing a second embodiment of the invention.

In the aforementioned embodiment in which the accumulators 26a, 26b are provided symmetrically in pairs, there may be employed only one accumulator. Moreover, although in the above embodiment the accumulators are arranged through the piston 3 in the cylinder body 1, the present invention may be embodied, to achieve a similar function, by providing a piston means comprising, as shown in FIG. 4, a pair of plates 3a, 3b with a resilient plate spring 53 put therebetween. Further, in this embodiment, a piston rod 2 may preferably be integrally provided with a flange-like ring 54 partially projected therefrom for preventing it from rotating freely. The flange-like ring 54 has a bore for receiving a pin 55 set in a horizontal position. The pin 55 is held in a horizontal hole 56 formed on the side of a cylinder body 1.

In addition to the foregoing embodiments in which the detecting pistons 45a, 45b of the detection means are separately arranged with respect to the accumulators 26a, 26b, respectively, the present invention may be embodied in an integrated constitution achieving a similar functional effect as described below.

Figure 5:
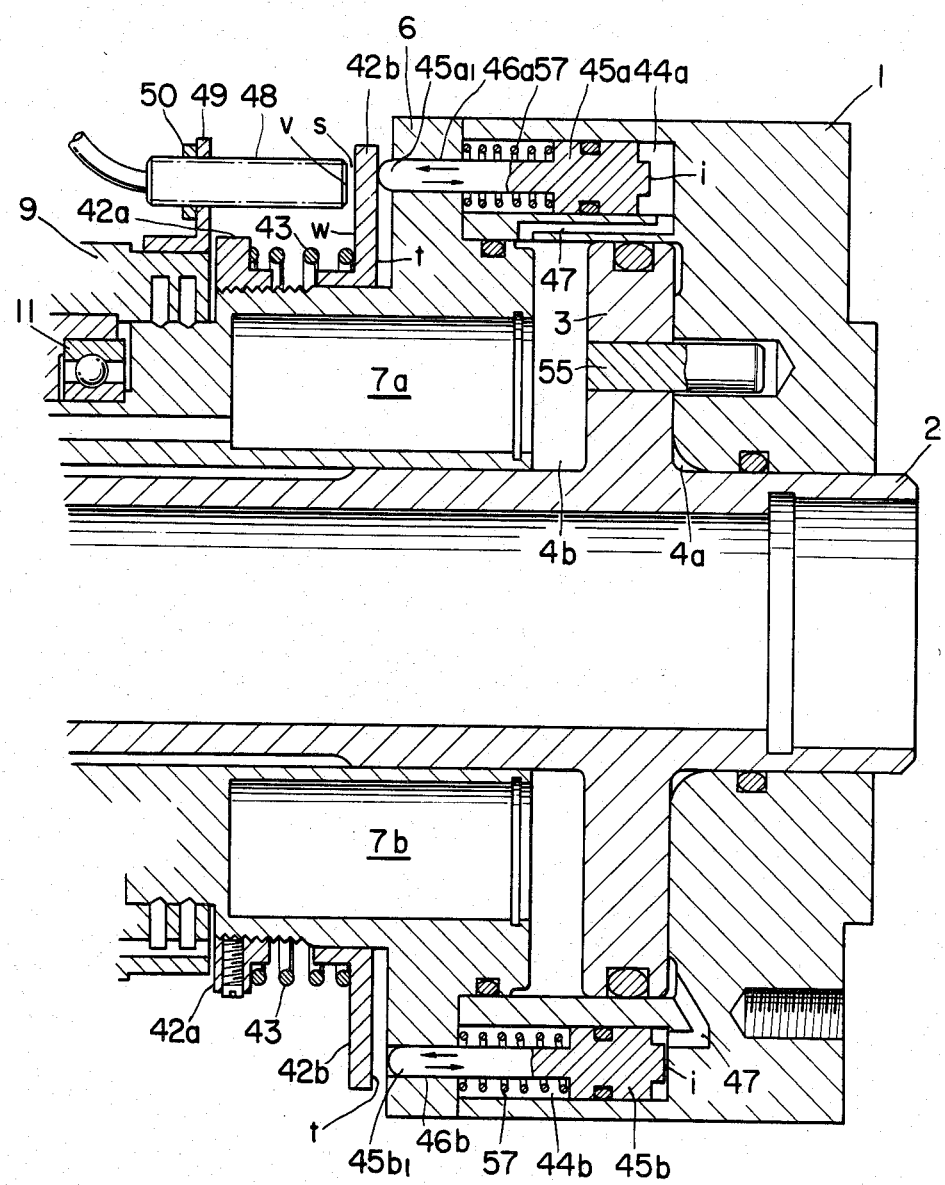
FIG. 5 is a partial longitudinal sectional view of a power cylinder, showing a third embodiment of the invention.

Referring now to FIG. 5, in another preferred embodiment of the invention, a pair of detecting pistons 45a, 45b are each respectively resiliently accommodated with one of a pair of springs 57 in one of a pair of cylindrical chambers 44a, 44b, so that respective back faces i of the detecting pistons 45a, 45b are normally urged toward the oil inflow side thereof.

Figure 6:
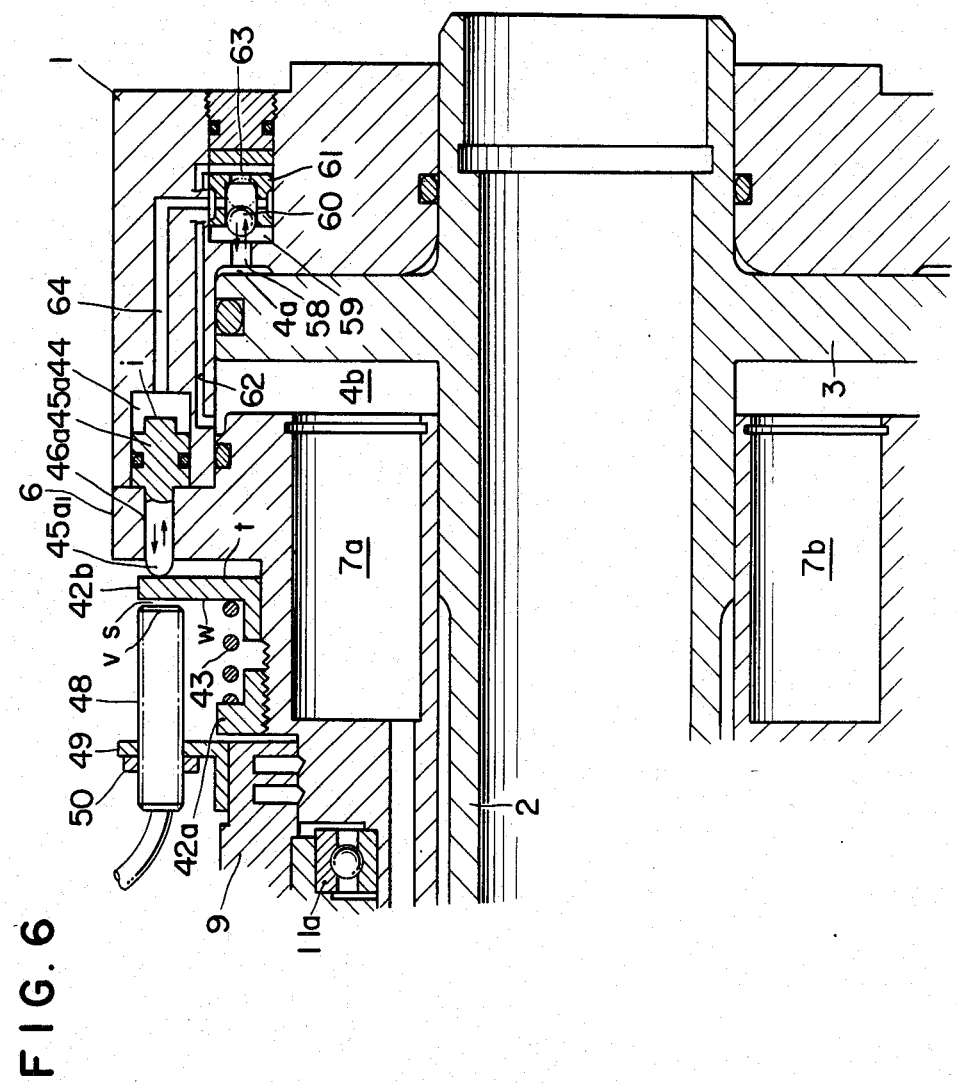
FIG. 6 is a partial longitudinal sectional view of a power cylinder, showing a fourth embodiment of the invention.

Referring now to FIG. 6, in still another preferred embodiment of the invention, the oil pressure of the oil chambers 4a, 4b is detected with a single detecting piston without using a spring. More particularly, in the cylinder body 1, there is provided a cylindrical chamber 59 communicating with the oil chamber 4a via a through hole 58. The cylindrical chamber 59 has a valve body 61 therein in which a reciprocally movable ball valve 60 of a larger diameter than the through hole 58 is accommodated. When hydraulic oil from the oil chamber 4b is introduced through an oil path 62 into the valve body 61, the ball valve 60 moves toward the through hole 58 to close it. Thus, the oil of the oil chamber 4a is kept from flowing into the chamber 59 while introducing the hydraulic oil from the oil chamber 4b via the oil path 62, a through hole 63 and an oil path 64 into the cylindrical chamber 44. To the contrary, when the pressure oil is fed into the oil chamber 4a, the ball valve 60 moves toward the chuck to close the through hole 63 communicating with the oil path 62. Thus, the pressure oil from the oil chamber 4a is introduced via the through hole 58 and the oil path 64 into the cylindrical chamber 44. In these embodiments, although the accumulators are provided in addition to the detecting pistons 45a, 45b, a similar functional effect can be achieved with a spring resiliently urging the detecting piston as shown in FIG. 5 instead of the accumulators.

As will be understood from the foregoing descriptions, according to the present invention, the supply of the pressure fluid is permitted to be stopped after a workpiece is held by a chuck because of the provision of the check valves, the accumulators and the oil path for lubricating oil, etc. Accordingly, all problems concerning heat generation due to viscous friction and oil leakage loss can be effectively solved. Moreover, as the pressure detecting means is provided in this invention, the condition of the pressure fluid can be always monitored whereby a safety operation and efficiently high-speed cutting operation can be carried out.

What we claim is:

1. A rotary fluid pressure cylinder device comprising:
   (a) a cylinder casing;
   (b) a stationary sleeve body for rotatably supporting the cylinder casing through bearing means;
   (c) a piston rod slidably accommodated in the cylinder casing, the piston rod having a piston slidably accommodated in an operating chamber in the cylinder casing so as to partition the operating chamber into two chambers;
   (d) means for feeding a fluid under pressure into the operating chamber and for discharging the fluid therefrom;
   (e) check valve means provided downstream of the means for feeding the fluid under pressure, the check valve means confining the fluid under pressure in the operating chamber when the supply of the fluid under pressure to the operating chamber is stopped; and
   (f) means for feeding lubricating oil into the bearing means, the lubricating oil feeding means being provided independently of the means for feeding fluid under pressure.

2. A rotary fluid pressure cylinder device according to claim 1, wherein the pressure fluid feeding and discharging means has a pair of flow paths, one of which connects a first oil bore formed in the cylinder casing holding means to one side of the operating chamber with respect to the piston, and the other of which connects a second oil bore formed in the cylinder casing holding means to the other side of the operating chamber with respect to the piston, the flow paths being selectively used in such a manner that one of the flow paths is used for feeding the pressure fluid into the operating chamber when the other of the flow paths is used for discharging it therefrom, the check valve means being provided midway the flow paths.

3. A rotary fluid pressure cylinder device according to claim 2, wherein the check valve means comprises a pair of check valves, each of which has a partition wall, with a round hole, for separating an inner space formed in the cylinder casing into two chambers, a pilot valve provided on one side of the partition wall, for opening and closing the round hole of the partition wall and a pilot spool, provided on the opposite side of the partition wall, for moving the pilot valve, one of the check valves being used for opening and closing one of the flow paths while the other of the check valves is used for opening and closing the other of the flow paths, a chamber of the pilot spool for one of the check valves being connected to the other of the flow paths while a chamber of the pilot spool for the other of the check valves is connected to one of the flow paths.

4. A rotary fluid pressure cylinder according to claim 1, wherein the bearing means has a pair of bearings disposed at a predetermined interval, an oil path being formed between the two bearings as part of lubricating oil feeding means.

5. A rotary fluid pressure cylinder according to claim 1, further comprising accumulating means for compensating for the change of fluid pressure in the operating chamber in order to keep the fluid pressure therein constant.

6. A rotary fluid pressure cylinder device according to claim 5, wherein the accumulating means comprises at least one accumulator having a tubular casing body provided through the piston so as to prevent the piston from rotating relative to the cylinder casing, two accumulating pistons accommodated slidably on the opposite sides of the tubular casing and an elastic member provided between the two accumulating pistons, one of the accumulating piston being subjected to the fluid pressure of one side of the operating chamber while the other of the accumulating pistons is subjected to the fluid pressure of the other side of the operating chamber.

7. A rotary fluid pressure cylinder device according to claim 5, wherein the accumulating means comprises an elastic member placed between two plates formed in a manner that the piston is separated into the two plates.

8. A rotary fluid pressure cylinder according to claim 5, further comprising means for detecting the pressure of the fluid in the operating chamber.

9. A rotary fluid pressure cylinder according to claim 1, further comprising means for detecting the pressure of the fluid in the operating chamber.

10. A rotary fluid pressure cylinder device according to claim 9, wherein the detecting means has at least one detecting piston operated by the fluid pressure in the operating chamber, a slide plate moved by the detecting piston and a detecting bar for outputting a signal for controlling the feeding and discharging of the pressure fluid for confining the pressure fluid in the operating chamber when the detecting piston is moved to a predetermined position.

11. A rotary fluid pressure cylinder device according to claim 10, wherein the slide plate is urged by an elastic member toward the detecting piston, the elastic force of the elastic member being adjustable so that the pressure level of the fluid to be confined in the operating chamber can be changed.

12. A rotary fluid pressure cylinder device according to claim 10, wherein the detecting means has a pair of detecting pistons, one of which is subjected to the fluid pressure of one side of the operating chamber, and the other of which is subjected to the fluid pressure of the other side of the operating chamber.

13. A rotary fluid pressure cylinder device according to claim 10, wherein the detecting means has a single detecting piston subjected to the fluid pressure of the both sides of the operating chamber and a valve for transmitting selectively the fluid pressure of both sides of the operating chamber to the detecting piston.

14. A rotary fluid pressure cylinder device according to claim 10, wherein the detecting piston is urged by an elastic member against the fluid pressure of the operating chamber whereby the detecting piston can function as the accumulating means as well as the detecting means.

15. A rotary fluid pressure cylinder device according to claim 10, wherein the detecting bar is connected to a controller which controls the feeding and discharging of the pressure fluid in response to a positional signal from the detecting bar capable of detecting the position of the slide plate.

* * * * *